United States Patent

Centoducati

[11] 4,030,159
[45] June 21, 1977

[54] WINDSHIELD WIPER BLADE LINER

[76] Inventor: Nicholas J. Centoducati, 2142 Cayuga Drive, Merrick, N.Y. 11566

[22] Filed: Oct. 6, 1975

[21] Appl. No.: 620,162

[52] U.S. Cl. .................... 15/250.42; 15/250.36
[51] Int. Cl.² ................................ B60S 1/38
[58] Field of Search ..... 15/250.36, 250.37, 250.40, 15/250.41, 250.42

[56] References Cited

UNITED STATES PATENTS

| | | | |
|---|---|---|---|
| 2,324,365 | 7/1943 | Coutts | 15/250.41 |
| 2,908,028 | 10/1959 | Runton et al. | 15/250.40 |
| 2,926,375 | 3/1960 | Flynn | 15/250.36 |
| 3,122,771 | 3/1964 | Dale | 15/250.36 |
| 3,545,028 | 12/1970 | Poland | 15/250.36 |
| 3,606,630 | 9/1971 | Haas | 15/250.36 |

*Primary Examiner*—Richard E. Aegerter
*Assistant Examiner*—John W. Shepperd
*Attorney, Agent, or Firm*—Joel Halpern

[57] ABSTRACT

A windshield wiper blade liner made from a substantially non-wettable synthetic polymeric material which is pre-stressed to snap onto a wiper blade. The liner is formed with a V-shaped wiper section and a plurality of upper lever arm sections which are integral with the wiper section and are separable to assist in positioning the liner on the blade and in removing the liner from the blade.

5 Claims, 3 Drawing Figures

WINDSHIELD WIPER BLADE LINER

BACKGROUND OF THE INVENTION

The present invention relates to windshield wiper blades and more particularly to an external liner therefor.

It is known that windshield wiper blades have a limited operational longevity which dictates their periodic replacement. However, such blades are generally made of a synthetic elastomeric material and require a substantial amount of such material in their formation. Since the material from which the blades are made is not inexpensive it will be recognized that the periodic replacement of the blades entails an expense in the maintenance of the vehicle. Further, in order to defer incurring the expense of wiper blade replacement many vehicle owners postpone such replacement and, as a result, operate the vehicle with wiper blades which no longer perform satisfactorily or at best afford only marginal visibility through the windshield.

SUMMARY OF THE INVENTION

It is one object of the invention to provide a windshield wiper blade liner which is securable detachably to a wiper blade and less expensive than the blade yet is capable of effectively cleaning a windshield.

It is another object of this invention to provide an inexpensive windshield wiper blade liner which can readily be snapped into place over a wiper blade and which can be easily removed therefrom.

It is yet another object of this invention to provide a windshield wiper blade liner which is inexpensive and from which accumulated snow can be readily removed.

Other objects and advantages of the invention will become readily apparent from the following description of the invention.

In accordance with the present invention there is provided a windshield wiper blade liner made from a substantially non-wettable synthetic polymeric material comprising:

An elongated wiper section including a pair of upwardly diverging side walls adapted to be detachably secured in overlying relation to a windshield wiper blade;

And a plurality of longitudinally spaced upper elements integral with said wiper section and extending upwardly therefrom, said upper elements each including first and second lever arms integral with and extending upwardly from the opposed side walls of said wiper section and terminating in free ends spaced from one another.

BRIEF DESCRIPTION OF THE DRAWINGS

In order that the invention may be more fully understood it will now be described, by way of example, with reference to the accompanying drawings in which.

DETAILED DESCRIPTION OF THE INVENTION

Figure 1:
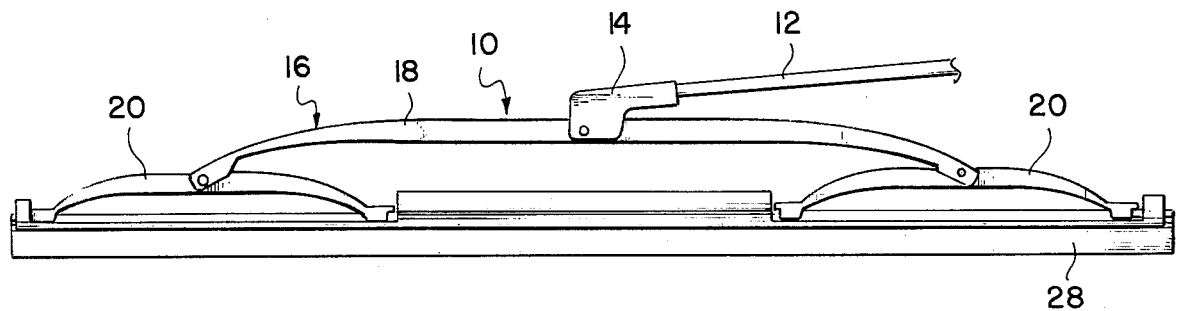
FIG. 1 is a side elevational view of a windshield wiper assembly with the liner of the present invention positioned on the wiper blade.

Referring to FIG. 1 of the drawings there is shown a windshield wiper assembly indicated generally by numeral 10. The assembly includes a wiper arm 12 mounted in an adapter 14. As is well known, the wiper arm is oscillatable to carry therewith the superstructure 16 which includes a primary yoke 18 pivotally mounted on the adapter and a pair of secondary yokes 20 which are pivotally connected at their mid-points to the primary yoke. The entire superstructure is spring urged in the direction of the windshield by a force exerted by wiper arm 12.

The extremities of the secondary yokes are adapted to be operatively connected to wiper blade 22. One conventional manner of securing the secondary yokes to the wiper blade is by means of claw-like extensions 24 formed on such yokes which are receivable within longitudinally extending grooves 26 of the wiper blade. It will be understood, of course, that the particular construction of the wiper blade assembly forms no part of the present invention and that the blade liner herein may take various cross-sectional configurations compatible with the blade to which it is to be detachably secured. Generally wiper blades are of a substantially tapered or V-shaped cross-sectional shape, and the liner will be described for use with such a wiper blade. However, it will be appreciated that the liner may be modified in shape to fit a particular blade configuration.

Figure 2:
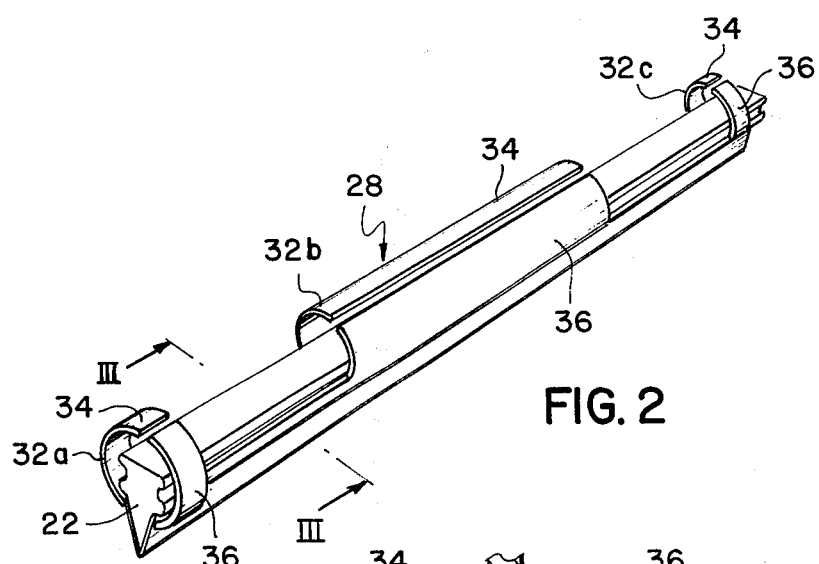
FIG. 2 is a perspective view of a windshield wiper blade with the liner of the invention positioned thereon.
Figure 3:
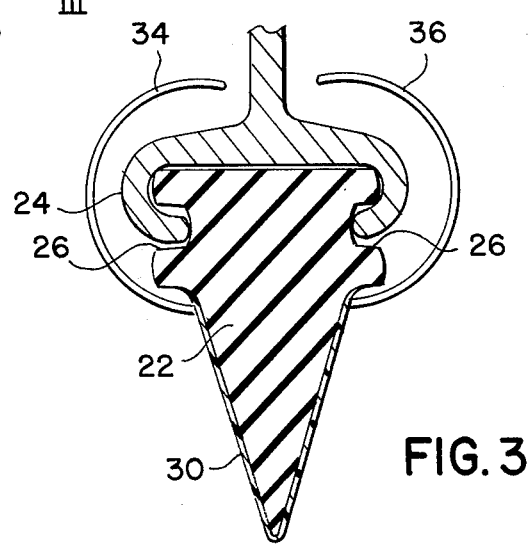
FIG. 3 is a cross-sectional view of the wiper blade-liner assembly of FIG. 2 taken along line III—III thereof.

As will be seen more clearly in FIGS. 2 and 3 the wiper blade liner 28 comprises an elongated generally V-shaped hollow wiper section 30 that is adapted to be detachably secured to the wiper blade. The presently preferred embodiment provides for the wiper section to be formed of a material which is resilient so as to exhibit a springlike characteristic. It may thus be snapped into place in spring-like fashion over the wiper blade and is removable therefrom by spreading apart the resilient side walls of the wiper section. The wiper liner includes a plurality of longitudinally spaced upper elements 32 which are integral with the wiper section, extending upwardly therefrom in the form of first and second lever arms 34, 36. The lever arms terminate in free ends which are spaced from each other to define a longitudinal slot therebetween. Preferably the lever arms project upwardly and outwardly to present an outer convex surface. Desirably a pair of such upper elements are disposed respectively at opposite longitudinal ends of the wiper section. The central element is given a substantially greater length than that of the end elements, and the spacing between the upper elements is such as to accommodate the secondary yoke of a windshield wiper superstructure to thereby permit securement of the superstructure to the blade.

The liner 28 is made of a suitable synthetic polymeric material which is substantially non-wettable. One such material is polytetrafluoroethylene sold, for example, under the trade name Teflon. However, other materials having comparable properties of non-wettability and to which a spring-like resiliency can be imparted are also utilizable.

It will be observed that by virtue of lever arms 34, 36 the liner may be easily gripped so as to separate the resilient side walls of wiper section 30 when the liner is to be positioned over the wiper blade, or when the liner is to be removed from the blade.

From the foregoing it will be seen that a wiper blade liner has been provided which can be detachably secured to a wiper blade to serve as the wiping surface. The wiper blade provides internal support for the liner and operatively connects same to the oscillatable wiper arm. Thus, replacement of the wiper blade is obviated. Due to the inherent resiliency of the liner, and the provision of the lever arms it is possible to easily rid the liner of any snow and/or ice which may accumulate thereon during the winter months to thereby provide a clean wiping surface for the windshield. The combination of the non-wettability of the liner and is spring-like resiliency make it eminently satisfactory for use during inclement weather when ordinary wiper blades become coated with moisture and/or snow and ice and tend to accumulate dirt and other material which reduces the wiping effectiveness.

As stated above, the preferred configuration for the liner is that of a "V" in cross-section. However, the apex of the liner may be given a more rounded shape if desired, the essential criteria being that its cross-sectional shape be compatible with the configuration of the wiper blade to which it is to be secured.

I claim:

1. A windshield wiper blade and a liner therefor made of a synthetic polymeric material comprising:
   a windshield wiper blade having a wiping tip at one extremity thereof and connected adjacent the other extremity thereof to the yoke of an oscillatable wiper arm;
   and a liner for said balance comprising a pair of side walls having a spring-like resiliency and extending upwardly in spaced diverging relation from a converged end portion forming a wiping tip and terminating in a plurality of longitudinally spaced upper elements including pairs of first and second opposed lever arms which encircle said other extremity of said blade and connected yoke in spaced relation, said side walls being spaces so as to enclose said windshield wiper blade therebetween and be normally biased against said wiper blade to be releasably retained thereon, the outer free ends of said opposed lever arms being pivotable to thereby flex said side walls to effect the removal of accumulated ice and snow therefrom and to selectively mount the liner on and remove the liner from the wiper blade.

2. A windshield wiper blade and liner therefor according to claim 1, wherein each of said lever arms projects upwardly and outwardly to present an outer convex surface, the free ends of said lever arms forming a longitudinal slot therebetween.

3. A windshield wiper blade and liner therefor according to claim 1, including a pair of said upper elements disposed respectively at the opposite longitudinal ends of said liner and a central upper element of substantially greater length intermediate said pair of upper elements, the spacing between said intermediate upper element and each of said pair of upper elements being sufficient to accommodate said yoke therebetween for connection to said wiper blade.

4. A windshield wiper blade and liner therefor according to claim 1, wherein the side walls of said liner have sufficient resiliency such that the liner can be snapped in place on said wiper blade.

5. A windshield wiper blade and liner therefor according to claim 1, wherein said polymeric material is polytetrafluoroethylene.

* * * * *